United States Patent [19]

Raa et al.

[11] 4,309,794
[45] Jan. 12, 1982

[54] METHOD FOR THE SEPARATION OF FAT, PIGMENTS AND ENTRAIL REMAINS FROM FISH RAW MATERIAL

[75] Inventors: Jan Raa, Tromso; Terje Strøm, Tromsdalen; Even Tidemann, Krokelvdalen; Ola Eide, Tromsdalen, all of Norway

[73] Assignee: Fiskeriteknologisk Forskningsinstitutt, Tromsø, Norway

[21] Appl. No.: 143,134

[22] Filed: Apr. 23, 1980

[30] Foreign Application Priority Data

May 3, 1979 [NO] Norway .............................. 791481

[51] Int. Cl.³ ............................................ A22C 25/16
[52] U.S. Cl. ............................................ 17/46; 17/51
[58] Field of Search ..................... 17/46, 1 G, 51, 56

[56] References Cited

U.S. PATENT DOCUMENTS

| 2,787,549 | 4/1957 | Heald | 17/46 X |
|---|---|---|---|
| 3,112,203 | 11/1963 | Watt | 17/46 X |
| 3,293,687 | 12/1966 | Denton et al. | 17/46 X |
| 3,471,299 | 10/1969 | Duckworth et al. | 17/1 G X |
| 4,087,563 | 5/1978 | Sekiguchi | 17/46 X |

FOREIGN PATENT DOCUMENTS

| 2630325 | 1/1978 | Fed. Rep. of Germany | 17/1 G |
|---|---|---|---|
| 2823249 | 12/1978 | Fed. Rep. of Germany | 17/1 G |
| 1207111 | 9/1970 | United Kingdom | 17/46 |
| 441909 | 12/1974 | U.S.S.R. | 17/46 |

*Primary Examiner*—Willie G. Abercrombie
*Attorney, Agent, or Firm*—Oblon, Fisher, Spivak, McClelland & Maier

[57] ABSTRACT

The invention concerns a method for the preparation of fish mass wherein the fish meat is separated from fat, pigment and entrail remains. The method can be utilized for fatty as well as for lean fish. This is achieved by holding fatty or lean fish raw material in an aqueous environment in which the pH is adjusted to pH 3-5, preferably pH 4, and in which the temperature is adjusted within the range of 20°-50° C. The fish meat with fish bones is separated from the liquid aqueous solution containing fat, entrail remains, and dissolved skin and abdominal epithelium and dark pigments from these, by methods known per se. The resulting fish mass is well suited for use as raw material in the production of manufactured foods, as the fish muscle proteins are not substantially denatured by the process.

5 Claims, No Drawings

METHOD FOR THE SEPARATION OF FAT, PIGMENTS AND ENTRAIL REMAINS FROM FISH RAW MATERIAL

The present invention concerns a method for the preparation of fish mass wherein the fish means is separated from fat, pigments and entrail remains. The method can be utilized for fatty as well as for lean fish. The resulting fish mass is well suited for use as raw material in the production of manufactured foods, as the fish muscle proteins are not substantially denatured by the process.

It is desirable to prepare fish mass, i.e. minced fish meat with or without bones, from small fish such as capelin, sardines, blue whiting, mackerel and the like. The prepared fish mass should fulfill the following general criteria: The mass should be free of entrails, the fat content should be low owing to considerations of product perishability, and the fish mass should be as light in color as possible, i.e., free of dark pigments from the skin and abdominal epithelium. In addition, the fish mass should have good functional characteristics. A method for the preparation of a fish mass satisfying the above criteria would make possible an increased food production from the large resources of fish raw material in the world, which today are utilized for the production of herring meal and herring oil.

Small fish can be claimed according to known manual or mechanical methods, either by splitting the abdomen of the fish and removing the entrails, or by cutting the fish into small pieces and rinsing away the entrails with water. If the latter method is used, the cleaning of the fish can be carried out by bulk handling of the fish raw material, i.e., individual handling of the fish is not necessary. However, intestinal remains will remain attached to the anus, and the connective tissue which attaches the intestinal remains to the fish muscle must be destroyed in order to remove the remaining intestinal offal.

The fat can be removed from fatty fish by known methods, such as the use of organic solvents, or by heating the fish material to 60° C. or higher and subsequently pressing it according to known methods, or by lowering the pH with organic or inorganic acids. A disadvantage common to the first two methods is that the fish muscle proteins become denaturated, and the product's functional characteristics are thereby greatly reduced. The latter method is utilized for the preparation of fish silage, in which the fat is released as a result of self-digestion of the fish raw material at low temperatures (for example 30° C.). The fat can then be separated by known methods. Owing to the self-digestion, however, the proteins will be greatly altered, and the protein-containing fraction will be liquid, discolored by pgiments, and will contain intestinal remains. It would be very difficult to prepare a suitable fish mass with this method.

Fish mass can be prepared by known methods for the separation of fish muscle from skin and bone. With these mechanical methods, however, residual skin and abdominal epithelium (black membrane), or dark pigments from these, will discolor the fish mass. This discoloring can be reduced in accordance with known methods by a subsequent washing of the fish mass with water or through the use of bleaching agents (for example, hydrogen peroxide).

Washing the fish mass will reduce the yield owing to the leaching out of water-soluble proteins, while the use of a chemical oxidizing agent for bleaching is generally undesirable owing to its unfavourable effect on the nutritional value of the product.

None of the known methods described in the literature teach a method for preparing a fish mass which would satisfy the criteria specified above in this patent description.

It is known that fat deposits in fish are surrounded by collagen-rich connective tissue. It is characteristic of collagen-rich connective tissue, for example, skin and abdominal epithelium, that its mechanical strength is reduced by heating it to above about 40° C. and/or by the effects of acid. It is also known that at temperatures above 45° C., denaturing of the fish muscle proteins commences, and denaturation increases with increasing temperature. Denaturation, however, is dependent on the relation of time to temperature.

Our experiments have shown that fish muscle heated to 30°-50° C. for, say, one hour becomes softer than unheated fish muscle. On the other hand, the fish muscle becomes firmer than untreated fish muscle if the pH is decreased, in accordance with the appurtenant patent claims. This holds true both for non-heated and especially for heated fish muscle. This condition is probably due to the precipitation of water-soluble proteins at the low pH. By combining a controlled treatment of the fish raw material at temperatures in the range of from 20°-50° C. with an acid treatment, one obtains the following advantages: (1) the fish muscle becomes firmer, (2) the connective tissue surrounding the fat cells is broken down and the fat is released, (3) the entrails become fragmented and loosen from the fish muscle, and (4) the skin and abdominal epithelium dissolve. The process is best carried out by adding water to the fish raw material. The result is then a liquid phase which contains dissolved skin and abdominal epithelium, intestinal remains and fat, and a solids phase consisting of cleaned fish meat and fish bones. These two phases can be separated by known methods, and the fat can be recovered from the liquid phase by known methods.

EXAMPLE 1.

Capelin were cut up into pieces 2-3 cm long and an equal amount by weight of water was added. Organic or inorganic acid (for example, acetic acid) was added to pH 4, and the fish raw material was heated in a controlled manner up to 40° C. At this temperature, liquid was circulated over the fish pieces for 45-60 minutes. Subsequently, the liquid phase, containing fat, intestinal remains, dissolved skin and abdominal epithelium and dark pigments from these, was decanted from the cleaned pieces of fish muscle with bones.

Following separation of the bones, the capelin mass had a composition in grams per 100 grams dry matter as specified below in Table 1.

TABLE I.

Composition of raw material and capelin mass prepared in accordance with the patent claim.

| | g/100 g Dry Matter | |
| --- | --- | --- |
| Data | Raw Material | Capelin Mass |
| Protein (N × 6, 25) | 35.8 | 94.7 |
| Fat (Soxhlet) | 60.6 | 3.5 |

-continued

| Data | g/100 g Dry Matter | |
|---|---|---|
| | Raw Material | Capelin Mass |
| Ash | 3.6 | 1.7 |

EXAMPLE 2.

Blue whiting were cut up into pieces of 3–4 cm length and an equal amount by weight of water was added. Organic or inorganic acid (for example, acetic acid and/or propionic acid) was added to pH 4, and the fish raw material was heated in a controlled manner up to 40° C. At this temperature, liquid was circulated over the pieces of fish for 75–90 minutes. Thereafter, the liquid phase, containing fat, entrail fragments (for example liver remains), dissolved skin and abdominal epithelium, and dark pigments from these, was decanted from the cleaned fish muscle pieces and bones.

Following separation of the bones, the blue whiting mass had a composition in grams per 100 grams dry matter as given below in Table II.

TABLE II.

Composition of raw material and blue whiting mass prepared in accordance with the patent claim.

| Data | g/100 g Dry Matter | |
|---|---|---|
| | Raw Material | Blue Whiting Mass |
| Protein (N × 6, 25) | 63.6 | 94.7 |
| Fat (Soxhlet) | 24.3 | 3.4 |
| Ash | 12.1 | 1.7 |

EXAMPLE 3.

Sardines were cut into pieces 2–3 cm long and an equal amount by weight of water was added. Organic or inorganic acid (for example, acetic acid and/or propionic acid) was added to pH 4, and the fish raw material was heated in a controlled manner up to 43° C. At this temperature, liquid was circulated over the fish pieces for 100–120 minutes. Subsequently, the liquid phase, containing fat, entrail fragments, dissolved skin and abdominal epithelium and dark pigments from these, was decanted from the cleaned fish muscle pieces and bone.

Following separation of the bones, the sardine mass had a composition in grams per 100 grams dry matter as given below in Table III.

TABLE III.

Composition of raw material and sardine mass prepared in accordance with the patent claims.

| Data | g/100 g Dry Matter | |
|---|---|---|
| | Raw Material | Sardine Mass |
| Protein (N × 6, 25) | 38.6 | 85.9 |
| Fat (Soxhlet) | 54.6 | 8.3 |
| Ash | 6.9 | 5.8 |

Having described our invention, we claim:

1. Method for the separation of fat, pigments and entrail remains from fish raw material including fish bones, characterized in that fatty or lean fish raw material is held in an aqueous environment in which the pH is adjusted to pH 3–5, and in which the temperature is adjusted within the range of 20°–50° C., removing said fish material including fish bones as a solid phase from dissolved fat, pigments and entrail remains.

2. A method according to claim 1, characterized in that inorganic or organic acids are utilized for adjusting the pH, preferably acetic acid and/or propionic acid.

3. A method according to claim 1, characterized in that the fish is held at the relevant temperatures for from 5 minutes to 5 hours, while liquid is circulated over the fish raw material.

4. A method according to claim 1, characterized in that the fish is held at the relevant temperatures for from 5 minutes to 24 hours without circulating liquid over the raw material.

5. A method according to claim 1, characterized in that in addition to separating the fish meat with fish bones from the liquid aqueous solution containing fat, entrail remains and pigments dissolved skin and abdominal epithelium and dark pigments are also removed.

* * * * *